United States Patent [19]
Griffith

[11] 4,290,731
[45] Sep. 22, 1981

[54] APPARATUS FOR PICKING UP OVERTURNED VEHICLES

[76] Inventor: John A. Griffith, 8935 Solon, Houston, Tex. 77064

[21] Appl. No.: 23,690

[22] Filed: Mar. 26, 1979

[51] Int. Cl.³ .......................... B66C 1/20; B66C 23/78
[52] U.S. Cl. ..................................... 414/678; 212/177; 212/189; 414/756; 414/764; 294/74
[58] Field of Search .............. 414/540, 787, 678, 756, 414/764, 781, 784, 694; 212/41, 43, 147, 177, 188, 189, 226; 294/74, 78 A

[56] References Cited

U.S. PATENT DOCUMENTS

| | | | |
|---|---|---|---|
| 2,426,284 | 8/1947 | Peterson | 414/678 |
| 2,622,540 | 12/1952 | Stewart et al. | 414/787 X |
| 3,622,025 | 11/1971 | Petersen | 294/74 X |
| 3,640,413 | 2/1972 | Klein | 294/74 X |
| 3,848,751 | 11/1974 | Holland, Sr. | 212/189 |
| 3,874,532 | 4/1975 | Metailler | 414/694 |
| 4,002,242 | 1/1977 | Eriksson | 212/177 |

FOREIGN PATENT DOCUMENTS

| | | | |
|---|---|---|---|
| 2364812 | 4/1978 | France | 414/678 |
| 557911 | 12/1943 | United Kingdom | 414/540 |

*Primary Examiner*—Trygve M. Blix
*Assistant Examiner*—Terrance L. Siemens
*Attorney, Agent, or Firm*—Gunn, Lee & Jackson

[57] ABSTRACT

An apparatus for righting or picking up overturned vehicles is provided. In the illustrated embodiment, the apparatus is a truck-mounted turntable able to rotate in either direction supporting a first pair of parallel frame members which are moved through a range of angularly elevated positions by hydraulic jacks. The first parallel frame members support a second pair of parallel frame members which are also deflected relative to the first pair by hydraulic jacks. A third pair of parallel frame members telescope inside the second pair, and they are extended by hydraulic jacks. The third pair terminates at a transverse frame member which is pin-connected to a pair of legs when the apparatus is extended to obtain support. The extended apparatus includes, at multiple locations, cable winches having spools with a cable wound thereabout. The cables are able to be extended and retracted and connect to slings adapted to be passed beneath an overturned vehicle such as a tractor-trailer rig. The slings are lifted to raise the overturned vehicle, and, through the use of a winch at each end of each sling, the overturned equipment can then be elevated and turned erect.

13 Claims, 5 Drawing Figures

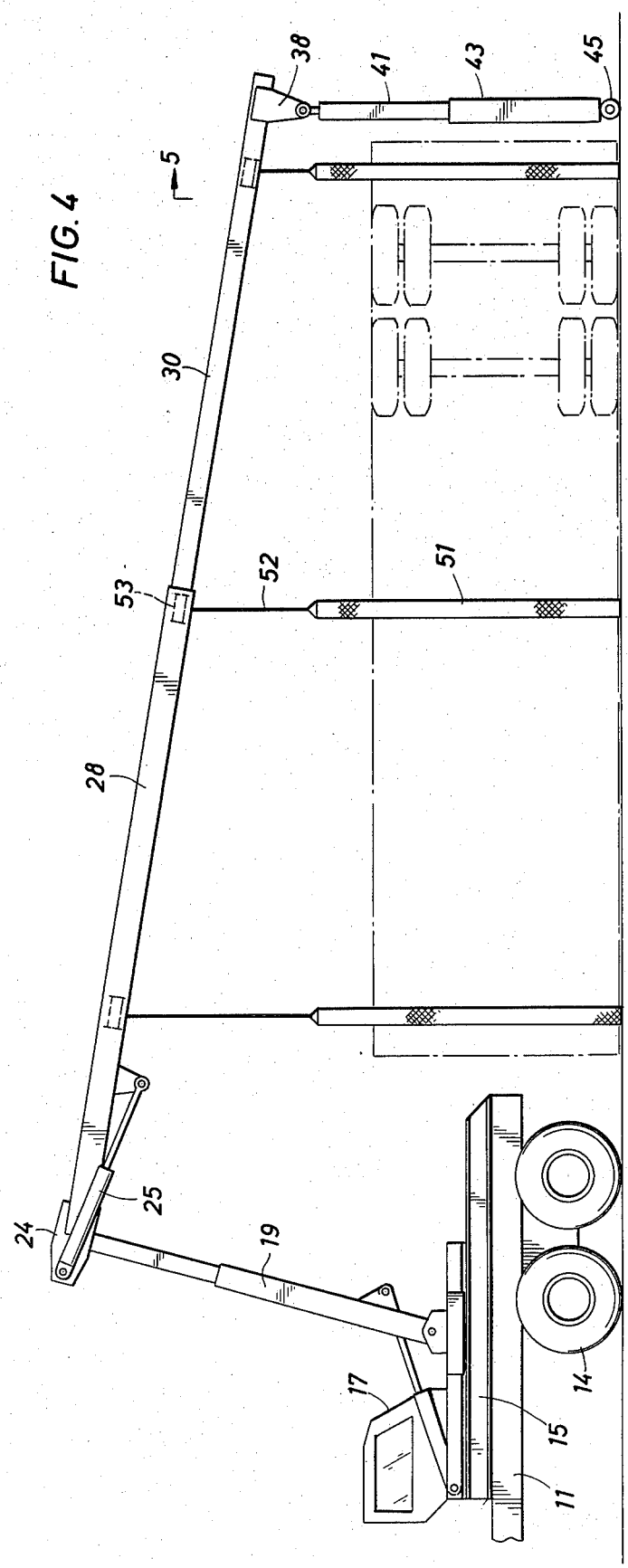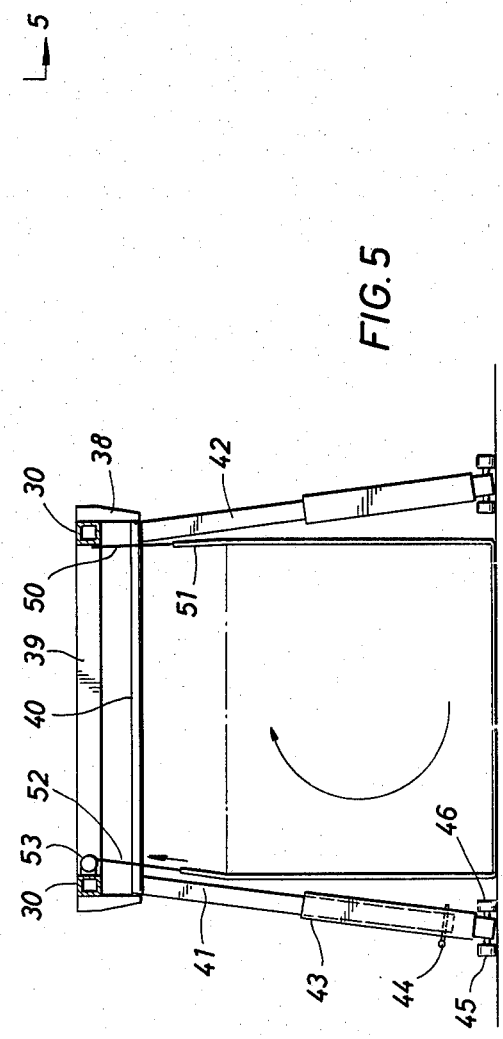

APPARATUS FOR PICKING UP OVERTURNED VEHICLES

BACKGROUND OF THE DISCLOSURE

Automobile and truck accidents normally require that the overturned equipment be turned upright before it can be moved away. Conventional equipment presently in use comprises a pickup truck having a pivoted or fixed boom on the truckbed. Typically, this equipment is limited in height because it must pass beneath telephone wires, power lines, freeway overpasses and the like. Accordingly, the truck-mounted equipment can stand no more than about twelve or fourteen feet in height. Because it is limited in height, it is limited in the angle at which the hoist cable lifts equipment. The hoist cable is ordinarily rigged by means of a hook to the overturned vehicle. In righting an overturned vehicle of some size, the hoist cable does little lifting and all too often tends to drag the overturned vehicle toward the tow truck. This is not the most proficient manner of lifting and righting an overturned vehicle.

The foregoing approach is more than acceptable for light vehicles in the range of one or two tons. It is not very effective in righting an overturned trailer with a weight of perhaps twenty to thirty tons. As an example, consider a tractor pulling a trailer connected to it via a fifth wheel. Consider further the trailer loaded with several tons of pipe so that the trailer and cargo mounted thereon weigh twenty-five tons. A load of this magnitude is not uncommon. In the event the tractor and trailer overturn, the current procedure by which the trailer is righted is to utilize two or three tow trucks positioned so that their hoist cables, when extended, reach over the top of the overturned trailer and hook to the trailer on the far side from the tow trucks. The cables, once extended, partly wrap around the fallen trailer. The trailer is then righted by pulling with the hoist cables. This pull is exerted almost parallel to the surface on which trailer rests because the tow trucks are constrained in height. Some skidding may occur as the trailer is pulled by the hoist cables toward the tow trucks. Eventually, it will roll, and, in so doing, it will roll toward an upright position. Eventually, the trailer is restored to an upright position. Restoration of the upright position requires that the trailer be located on a surface sufficiently firm to hold the trailer against unlimited skidding and further requires that the trailer withstand the twisting that results from the steps taken to upright it.

It is not uncommon for an overturned trailer to block traffic for upwards of two or three hours, while two or three tow trucks are located. Moreover, there is a severe limitation on the operative deployment of the tow trucks. That is to say, if the trailer has overturned on the shoulder of a major thoroughfare, it is almost essential in most circumstances that the tow trucks be located on the pavement to pull the trailer back toward the pavement in the act of uprighting it. This places the several tow trucks on the pavement in a position which inevitably must block traffic flow. When traffic is blocked, substantial police work is required to redirect traffic for the duration of the accident. This is expensive and very aggravating to the public.

BRIEF DESCRIPTION OF THE DISCLOSURE

The present invention is an apparatus which gives more flexibility to the equipment operator for the purpose of uprighting an overturned trailer. Indeed, the present invention can be used to simply lift an overturned trailer without uprighting it so that it can be towed away.

The present apparatus thus enables the operator to position the equipment more conveniently, as, for example, aligned at the end of an overturned trailer. This readily locates the emergency equipment off the pavement in most instances. The equipment is more easily handled inasmuch as there is no dragging effort applied to the overturned vehicle. Rather than dragging, the overturned vehicle is raised ever so slightly. Once raised, it can then be rotated above the ground or pavement until the wheels of the trailer are again located beneath the trailer. At this time, the trailer can be lowered to the ground to be ground supported on the tires or wheels repositioned beneath it. Even if the trailer has come completely free of the tractor and has rubber tired wheels only at one end, most trailers have a retractable pair of wheels near the forward end which can be selectively extended to hold up the front end of the trailer when the trailer is disconnected from its tractor. These wheels can be raised to an out of the way position, tucked beneath the front part of the trailer, when the trailer is supported on a tractor. This readily enables a tractor equipped with fifth wheel to back up to the trailer and make the conventional tow connection via the fifth wheel.

The present invention is thus summarized as truck-mounted emergency vehicle equipment which handles an overturned trailer in an entirely different manner. It utilizes a turntable which rotates in either direction to extend the described equipment. The turntable includes pivot connections with a first pair of parallel frame members which are deflected at different elevated angles by means of hydraulically powered piston and cylinder apparatus. The first parallel frame members, in turn, connect to a second pair of parallel frame members which are also extendable at different angles by hydraulic piston and cylinder apparatus. A third pair of parallel frame members telescope inside the second pair and are extended from the second pair of means of a hydraulic jack. At the very tip end of the third pair of frame members, there is a transverse frame member which has a removable pin connection with a set of detachable legs. The legs and supportive framework are in an inverted U-shaped arrangement and support the first, second and third frame members in the extended position. The second and third frame members support slings adapted to be positioned beneath an overturned trailer. The slings, themselves, are connected at each end to cables which are extended or retracted by powered winches. The slings selectively hoist an overturned vehicle and upright it.

BRIEF DESCRIPTION OF THE DRAWINGS

FIG. 4 shows the emergency vehicle of the present invention picking up an overturned trailer wherein cable supported slings are extended beneath the trailer and are selectively raised to elevate an overturned trailer; and FIG. 5 is a view along the line 5—5 of FIG. 4 showing how a sling cable is passed beneath an overturned trailer and further showing how the sling and cable can be extended or retracted for rotating the trailer to restore the trailer to an upright position.

DETAILED DESCRIPTION OF THE ILLUSTRATED EMBODIMENT

Figure 1:
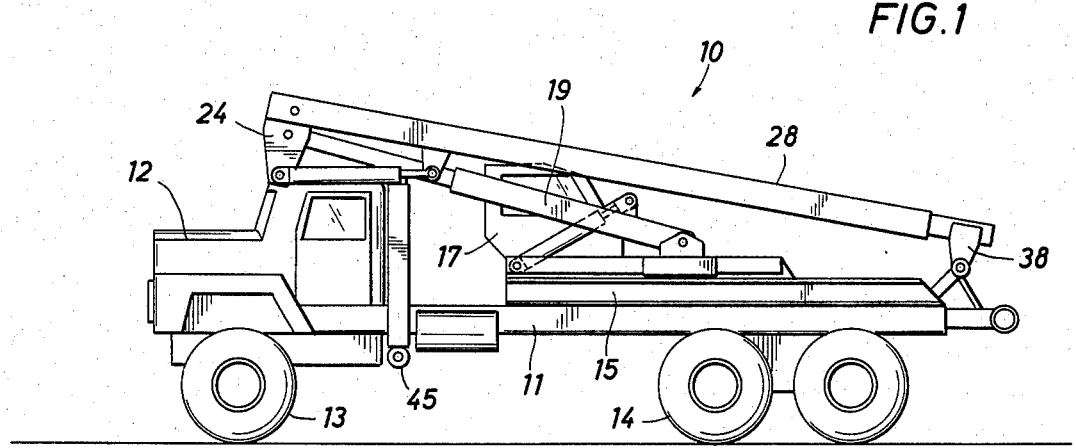
FIG. 1 is a side view showing the emergency equipment of the present invention with the equipment retracted and mounted on the bed of a heavy-duty truck.

In FIG. 1, the emergency vehicle of the present invention is identified by the numeral 10, where it is shown on a heavy-duty truck having a substantial frame 11 which extends to the rear of a truck cab 12. The truck is of typical construction having front wheels 13 and rear wheels 14. Dual tandem wheels and axles are illustrated. The flat bed of the truck is defined by the rear framework 11 and supports the apparatus of the present invention. The present invention includes a fixed, supportive frame member 15 which supports a rotatable turntable 16 which is free to rotate in either direction. The turntable 16 supports an operator seat and suitable hydraulic controls arranged near the operator set, all of this equipment being received at a small enclosure 17 supported on the turntable. The enclosure 17 need not be total; it is there primarily to provide some kind of shielding around the operator and to enclose the various controls for the hydraulic equipment to be described.

Figure 2:
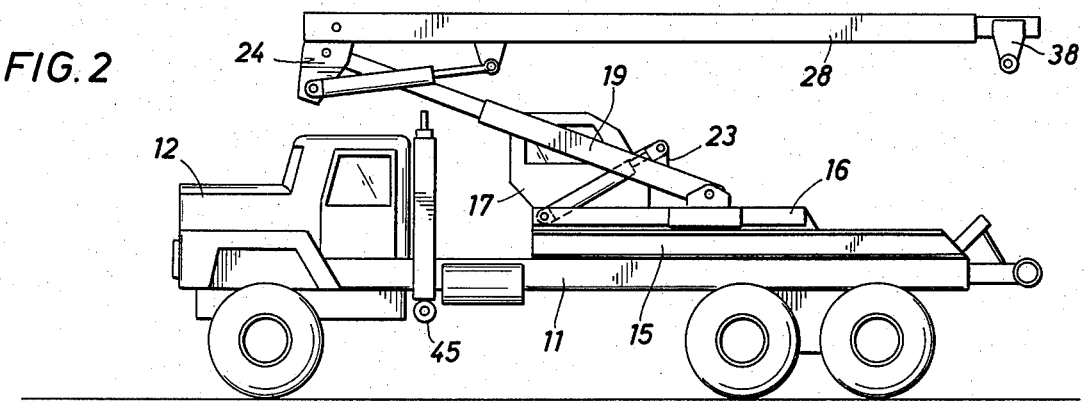
FIG. 2 is a view similar to FIG. 1 showing how the equipment extends with a first and second angularly positioned pair of frame members.
Figure 3:
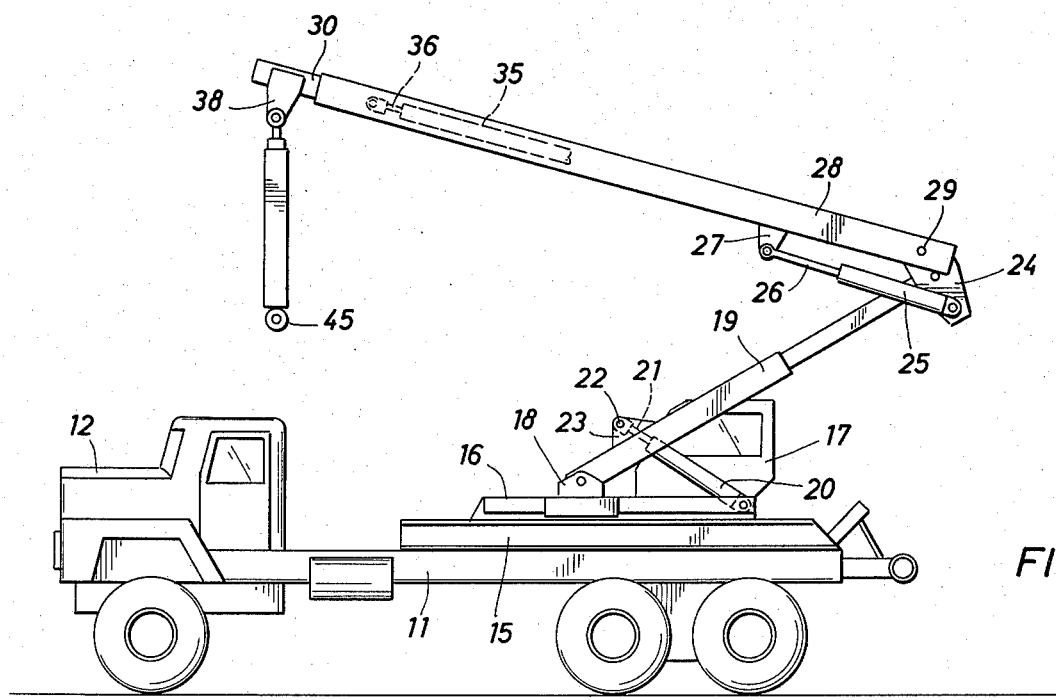
FIG. 3 is a view similar to FIGS. 1 and 2 showing rotation of the turntable supporting the equipment whereby it is able to reach forwardly of the truck and pick up an inverted, U-shaped dolly to go underneath the end of the extended frame members.

The turntable 16 supports an upstanding ear or tab 18 which is pin-connected with a first frame member 19. There are two parallel frame members 19, one supported on each side of the turntable, and they are spaced from one another by a distance of about two or three meters. The frame member 19 is thus pin-connected at one end and able to rotate around the pin connection as shown in the contrast of FIGS. 1, 2 and 3. The frame members 19 have a fixed length, but are, however, adjustable in angular position. This is achieved by means of a hydraulic motor which has the form of a piston and cylinder arrangement. The drawings disclose a hydraulic cylinder 20 which has a piston rod 21 extending from it. The lower end of the cylinder is pin-connected to the turntable 16. The piston rod 21 extends to a pin connection 22 which is a reinforced gusset 23 appended to the first frame member. As mentioned before, this equipment is duplicated on both sides of the turntable. Inasmuch as the equipment is symmetrically constructed and operates in the same manner, no reference numerals are assigned to the duplicate equipment in the drawings. Thus, the equipment includes two duplicate hydraulic motors which are identically constructed and identically connected. They also operate simultaneously so that both extend at the same instant by the same extent. When they extend, they raise the first frame member 19. This frame member, being pivotally connected at the lower end, rotates toward an upstanding position as will be described relative to FIG. 4. The down or retracted position for the first frame member is shown in FIG. 1.

The first frame member 19 terminates at a transverse plate 24 at the upper end. The plate 24 is fixedly attached to the frame member 19 and serves as the fixed pivot point for a second hydraulic motor which includes a cylinder 25 and protruding piston rod 26. The piston rod 26 is extended by hydraulic pressure applied to a piston within the cylinder in the conventional manner. The piston rod 26 is pivotally connected to a protruding, fixed arm 27 appended below a second frame member 28. The frame member 28 is pivotally connected by means of a transverse mounting shaft 29 which connects the second frame member 28 to the fixed pivot plate 24. The second frame member 28 is able to be rotated and rotates about the pivot at 29. Its rotation is obtained by operation of the hydraulic motor. Thus, the hydraulic motor operates to thereby extend the piston rod 26. This is shown in the contrast of FIGS. 1 and 2, as an example. Further rotation is shown in the contrast between FIGS. 2 and 3. In any case, the second frame member 28 is positioned at an angle compared to the first frame member 19 determined by the hydraulic motor which connects between the two.

The second frame member 28 is substantially hollow and preferably formed of hollow, rectangular stock. It supports suitable transverse framing so that the duplicate second frame member is braced to it to form a generally rectangular structure. The hollow frame member 28 receives a telescoping third frame member 30 which is slightly smaller in cross section so that it will slide inside the second frame member 28. The frame members 28 and 30 are shown in the retracted position in FIG. 3. A hydraulic motor 35 which is parallel to the second frame member 28 includes a piston rod 36 which extends from the piston and cylinder arrangement and initiates telescoping movement. When the hydraulic motor 35 is operated to retract, the frame member 30 is retracted as shown in FIGS. 1, 2 and 3. It is extended in FIG. 4 as will be described. One end of the hydraulic motor is fixed to the frame member 28, while the movable end of the piston rod is connected to the frame member 30.

Again, it must be emphasized that the frame member 30 is duplicated on two sides of the equipment and is symmetrically constructed. This symmetrical construction and duplicate arrangement is aided by a transverse frame member connecting the two frame members 30 together. The frame member 30 supports a downwardly protruding, fixed clevis 38 which incorporates a receptacle for a pin. Referring momentarily to FIG. 5 of the drawings, the frame member 30 is there shown supporting the downwardly directed clevis 38. A transverse frame member 39 joins the two parallel frame members 30 together. The downwardly extending clevis 38 is momentarily connected to a horizontal tubular frame member 40 which can be of any shape as long as it provides sufficient strength to the apparatus. The frame member 40 is connected to a left-hand leg 41 and a right-hand leg 42. The legs 41 and 42 are identically constructed, and each includes a fixed upper portion and a telescoping lower portion. Accordingly, FIG. 5 discloses how the leg 41 telescopes into a larger, lower leg portion 43. They telescope together. The height of the bar 40 is determined by placement of a lock pin 44 which functions somewhat as a cotter pin. With suitably spaced drill holes formed in the legs 41 and 43, the cotter pin 44 is selectively removed and repositioned to alter the height of the frame member 40 above the ground. The lower telescoping leg portion 43 terminates at a pair of small rollers 45 and 46 which enable the inverted U-shaped rear leg assembly to roll on the pavement or ground. If desired, the rollers 45 and 46 can be omitted, and mud skids can be substituted for them.

The equipment travels down the highway with the leg assembly of FIG. 5 disconnected. The leg assembly shown in FIG. 5 is best carried just behind the cab as illustrated in FIG. 2. In FIG. 3, it is shown being hoisted above the cab, achieved by hand removal and replacement of pins inserted through the end located clevis 38 into the horizontal frame member 40 as depicted in FIG. 5.

Scaling of the present equipment should be noted. In light of the fact that dimensional variations in trucks and trailers are in some part controlled by different states which inevitably have different dimensional requirements, it should be noted that the detachable leg assembly of FIG. 5 can be adjusted over a significant range. Through the use of the telescoping leg arrangement shown, the total height of the leg assembly can be varied. The adjustment in height is accomplished by telescoping the legs upwardly or downwardly. The third frame members 30 are typically fixed in relative width, as, for example, by supporting the transverse frame member 39 shown in FIG. 5. Nevertheless, this width is made as large as possible. Smaller loads are readily accommodated by the cable and sling arrangement to be described. The cable and sling arrangement is an important factor. FIG. 5 shows one such cable and sling arrangement. The numeral 50 identifies a first cable which is connected to a sling 51. The cable 50 is shown in FIG. 5 anchored to the frame member 30. It can be anchored or fixed on the one hand, or, in the alternative, it can be spooled around a winch. The sling 51 preferably has sufficient length to extend around the fallen trailer and terminates at a second cable 52. The cable 52 is spooled around a bidirectional electrically or hydraulically operated winch 53. The winch 53 can be duplicated for the cable 50 as desired.

The cables 50 and 52 are fairly strong, being typically woven wire ropes of a suitable strength. The sling is markedly wider than the wire ropes. Wire ropes are uniquely strong and possibly will cut into the cargo and trailer which is to be hoisted. Accordingly, the two cables are connected to a sling which is, itself, measurably wider, typically in the range of ten to twenty centimeters in width. This increase in width serves several purposes. For one, it prevents cutting the trailer or the cargo on the trailer as might occur with a small diameter woven wire rope. Secondly, it provides a greater surface in contact with the overturned trailer and its cargo. This is advantageous because it increases the frictional grip. It is necessary that the sling frictionally grip the trailer somewhat so that, during rotation of the trailer, the frictional grip will rotate the overturned trailer back toward the upright position. Further, the sling is helpful in that it provides a point of disconnection from the cables 50 and 52. When the equipment arrives on the scene, it is necessary to snake the slings underneath the overturned trailer. Through the use of relatively thin slings with significant width, the sling apparatus can be pushed, snaked and otherwise forced beneath an overturned trailer. Only a small gap between the overturned trailer and the surface on which it rests is necessary to enable this to occur. It is also possible to get the sling around the trailer by coming over the end as exemplified in FIG. 4. In any case, the operation of the cables and sling equipment described to this juncture assists measurably in rigging the equipment for the intended operation.

Tracing through a cycle of operation, assume, for purpose of discussion, that a trailer has overturned and is located on level ground, either on the pavement, the shoulder or off the road. The truck of the present disclosure is aligned with the trailer at one end or the other. The turntable 16 is rotated so that the inverted U-shaped leg assembly can be connected, this contrast being shown jointly in FIGS. 2 and 3. Once the leg supports are connected, the first, second and third frame members are deployed in whatever fashion necessary to extend over and approximately parallel to the fallen trailer. As shown in FIG. 4, they are not precisely parallel, but they are sufficiently overhead so that they operate as an overhead support structure for the trailer. In particular, the hydraulic motors are operated to accomplish the arrangement of FIG. 4, namely, the turntable of the emergency equipment at one end of the fallen trailer and the support legs at the other. It is noted that the surface exemplified in FIG. 4 is generally level. The telescoping leg arrangement shown in FIG. 5 is able to accommodate variations in level. As an example, the truck can be located over a range of different elevations relative to the overturned trailer. Indeed, the equipment will operate on sloping ground within a range of limitations. The sloping ground may require the incorporation of longer cables on the slings.

In the example described, FIG. 4 discloses an overturned trailer. The equipment has been rigged with three sets of slings and cables. It may operate in some instances with two. In other instances, it may require four. This is a scale factor which can be accommodated by positioning two, three or four sets of slings, cables and winch apparatus along the length of the second and third frame members. Ideally, the winches are supported on the inside edge of the second frame members, although one set is shown on the remote end portion of the third frame members.

Again, dependent on scale factors such as the dimensions of the overturned trailer and the load on it, the cables and slings are positioned beneath the overturned load. Once reconnected, they are in a position enabling the trailer to be raised. As shown in FIG. 4, the winches are operated simultaneously to raise the trailer. Sometimes, it may be necessary to raise slightly only one end of the trailer first. For example, if the left-hand end of the overturned trailer is readily accessible and a sling can be passed under it rather easily, then it might be raised slightly so that the sling at the center portion can be passed beneath the overturned trailer. The positioning of several slings beneath the trailer, once achieved, is a preliminary step to raising the entire weight of the trailer. Through the use of suitable power sources and gear boxes in the winches, the entire load is raised ever so slightly. Preferably, it is raised evenly so that the weight of the load is evenly distributed on the several slings. After it has been raised by a slight distance, it is then free of the ground. Once free of the ground, the winches are then operated to rotate the overturned trailer. Typically, it will require rotation through ninety degrees to reposition the wheels of the trailer beneath the trailer. This might be aided by a temporary extension of the retractable support wheels at the front of the trailer. In any case, rotation through ninety degrees is achieved by operating the winches along one side of the trailer to retract cable, while the winches along the other side of the trailer are not operated. They can be switched off or even omitted as exemplified in FIG. 5. In any case, rotation of the trailer is achieved in the foregoing manner.

Once the trailer has been brought to an approximate upright condition, the winches are then operated to lower the trailer to the surface. Then, the trailer can be set on the surface on its rubber tired wheels at the rear and can also be either sling supported or temporarily supported on the retractable front wheels beneath the trailer.

Once the trailer has been turned to an upright condition, it can be completely set down on the ground or supported by one sling only or by two slings. If the trailer is at an inconvenient location of this moment, the emergency equipment 10 of this invention can drive forward carrying the trailer with it. It may be necessary to drive only a few feet, or it can drive forward a great distance. This usually depends on whether or not there is a convenient tractor handy for reconnection to the uprighted trailer to pull it away. Absent a readily available tractor, the emergency vehicle 10 can, itself, function as a tractor. Thus, when the trailer is turned upright and at least the rear wheels of the trailer are on the ground, the front part of the trailer can be supported by the sling apparatus shown in FIG. 4 so that the equipment can be driven forwardly at least slowly and have the trailer follow on its rear wheels. The emergency vehicle 10 is then readily able to turn the corner, as, for example, by operating the turntable 16 during a turn.

It is not ordinarily contemplated that the emergency vehicle 10 travel a great distance supporting the load of the trailer inasmuch as some difficulty will occur on severe turns which may require operation of the turntable to accommodate flexure during turning. In this sense, the turntable 16 can be said to function like the fifth wheel on a tractor.

While the foregoing is directed to the preferred embodiment, the scope of the present invention is determined by the claims which follow.

I claim:

1. Emergency vehicle apparatus for engaging and uprighting an overturned elongate trailer or the like which comprises:
    (a) a truck-borne framework comprising first and second telescopically connected frame members having a specified lengthwise extent;
    (b) a truck-borne frame member being pivotally interconnected with said first frame member and being rotatable and elevatable relative to said truck for adjusting the height and position of said first and second frame members, said truck-borne frame member extending said first and second frame members approximately parallel to and along an overturned vehicle;
    (c) at least a pair of elongate slings supported by said frame members which are adapted to be selectively placed around and beneath an overturned vehicle;
    (d) means for selectively raising said slings to raise and elevate an overturned vehicle supported on said slings;
    (e) end located support leg means affixed to the end portions of said first and second frame members to enable said first and second frame members to be extended approximately over an overturned vehicle such that said leg means is located at one end of the overturned vehicle and the emergency vehicle apparatus is located at the other end thereof, said support leg means having ground contacting means facilitating movement of said end support leg means on the ground to permit movement of the vehicle to another location.

2. The apparatus of claim 1, further including motor means for extending and retracting said first and second frame members and for rotating and elevating said truck mounted frame member.

3. The apparatus of claim 1 including a truck-mounted rotatable turntable able to rotate bidirectionally, said truck-mounted turntable supporting said truck-mounted frame member.

4. The apparatus of claim 3 including hydraulic motor means mounted on said turntable and connected between said turntable and said truck-mounted frame member and adapted to extend and retract and wherein said truck-mounted frame member is pivotally connected to said turntable such that said hydraulic means varies the angular position of said truck-mounted frame member relative to said turntable.

5. The apparatus of claim 1 wherein said slings are connected to an extendable and retractable cable, and said cable is spooled around a winch which operates bidirectionally to raise and lower said slings.

6. Vehicle mounted apparatus for lifting a load such as engaging and uprighting an overturned elongated trailer or the like which comprises:
    (a) a truck-borne framework comprising first and second telescopically connected frame members having a specified lengthwise extent;
    (b) truck-borne means including a truck-borne frame member being pivotally interconnected with one of said first and second frame members and being rotatable and elevatable relative to said truck, said truck-borne means extending said firsrt and second frame members in lifting position over said load;
    (c) at least a pair of elongate slings supported by said frame members which are adapted to be selectively placed around and beneath said load;
    (d) means for selectively raising said slings to raise and elevate an overturned vehicle supported on said slings; and
    (e) ground contacting means interconnected with at least one of said first and second frame members, said ground contacting means facilitating support of one end of said truck-borne framework relative to the ground and movement of said truck-borne framework along the ground.

7. Truck-borne lifting apparatus for engaging and lifting loads such as uprighting overturned vehicles and the like which comprises:
    (a) a truck-mounted frame structure adapted to be supported by a truck and being rotatable and elevatable relative to said truck;
    (b) a first frame being pivotally connected to said truck-mounted frame structure;
    (c) a second frame being telescopically connected to said first frame, said first and second frames adapted to be positioned in lifting position over a load such as an overturned vehicle or the like, said second frame being capable of extension and contraction relative to said first frame to accommodate the length of said load;
    (d) at least a pair of elongate slings positioned along the length of said first and second frames and adapted to be selectively placed around and beneath said load;
    (e) powered winch means at each extremity of said slings for selectively raising said slings to impart selective raising and rotating movement to said load supported on said slings; and (f) ground contacting means at one extremity of said second frame means for supporting one end of said first and second frame means relative to the ground and for permitting movement of said first and second frame means and any load supported by said slings along the ground to another location.

8. The apparatus of claim 7, wherein:
said slings are supported by respective ones of said first and second frames, whereby the spacing of said slings is adjusted upon contraction and extension of said first and second frame sections.

9. The apparatus of claim 7, wherein said ground contacting means comprises:
end located support leg means affixed to the end portions of said second frame member to enable said first and second frame members to be extended approximately over said load such that said leg means is located at one end of said load and the truck-mounted frame structure is located at the other end thereof.

10. The apparatus of claim 7 including:
(a) first motor means for positioning said truck-mounted frame relative to said truck;
(b) second motor means for positioning said first frame relative to said truck-mounted frame; and
(c) third motor means for inducing extension and contraction movement of said second frame relative to said first frame.

11. The apparatus of claim 7 including a truck-mounted rotatable turntable able to rotate bidirectionally, said truck-mounted frame member being pivotally interconnected with said turntable.

12. The apparatus of claim 11 including:
hydraulic motor means mounted on said turntable and connected between said turntable and said truck-mounted frame member and adapted to extend and retract and wherein said truck-mounted frame member is pivoted by said hydraulic motor means relative to said turntable such that said hydraulic means varies the angular position of said truck-mounted frame member relative to said turntable.

13. The apparatus of claim 7 wherein:
each of said slings includes an extendable and retractable cable, and said cable is spooled around winch means at each side of said first and second frames which operates bidirectionally to raise and lower said slings to selective lifting and rotation of said load.

* * * * *